(12) United States Patent
Asmanis

(10) Patent No.: US 6,647,518 B1
(45) Date of Patent: Nov. 11, 2003

(54) METHODS AND APPARATUS FOR ESTIMATING A BIT ERROR RATE FOR A COMMUNICATION SYSTEM

(75) Inventor: Georgios S. Asmanis, Costa Mesa, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/561,014

(22) Filed: Apr. 28, 2000

(51) Int. Cl.[7] .................................................. G06F 11/00
(52) U.S. Cl. ...................................................... 714/707
(58) Field of Search .............................. 714/704–707, 714/719, 708, 746, 786, 795, 821, 738, 744; 370/354, 466, 470, 493, 472, 522, 509, 512, 222, 510; 380/261; 379/290; 377/188, 111, 107; 359/110, 118, 133, 177, 128, 161; 375/354, 371, 376, 357; 709/239

(56) References Cited

U.S. PATENT DOCUMENTS

| | | | | |
|---|---|---|---|---|
| 4,283,620 A | * | 8/1981 | Drescher et al. .............. 377/29 |
| 5,619,509 A | * | 4/1997 | Maruyama et al. .......... 714/707 |
| 5,732,089 A | * | 3/1998 | Negi ............................ 714/704 |
| 5,761,216 A | * | 6/1998 | Sotome et al. ............... 714/738 |
| 5,764,651 A | * | 6/1998 | Bullock et al. .............. 714/708 |

* cited by examiner

Primary Examiner—Albert Decady
Assistant Examiner—Guy Lamarre
(74) Attorney, Agent, or Firm—Keith Kind; Kelly H. Hale

(57) ABSTRACT

There is provided programmability, automatic error correction, flexible inter-path implementation for a bit error rate estimator. The bit error rate estimator uses an initialization configuration for a number of memory elements of a reference pattern generator in such a way as to eliminate the need for an N bit counter. In addition, the bit error rate estimator allows for two error correction options that may be pre-grammed into the system. One option allows the system administrator to monitor the errors in the system and take steps as deemed necessary. Another option generates a new reference pattern if the number of errors detected reaches a predetermined maximum amount. Thus, the bit error rate estimator provides automatic error correction, programmability, and flexible inter-path implementation.

18 Claims, 6 Drawing Sheets

METHODS AND APPARATUS FOR ESTIMATING A BIT ERROR RATE FOR A COMMUNICATION SYSTEM

BACKGROUND OF THE INVENTION

1. Technical Field

The present invention generally relates to a bit error rate estimator and methods for its use. More particularly, the present invention relates to a programmable bit error rate estimator having automatic error correction, operating speeds independent of the length of the pattern being transmitted, and flexible inter-path implementation.

2. Background Art and Technical Problems

Communications systems use channels for high speed transmission of data. For example, SONET (Synchronous Optical Network) applications use fiber optic channels for high speed transmission of data. In order to have efficient operation of the channels in such a network, the routing paths must be monitored by measuring the number of errors per unit of time. However, even if the channel itself is efficient, interfaces to the transmitter and/or receiver of a network system may lack efficiency. In this respect, the errors occurring within the entire network system must be accounted for. The number of errors in a communications system may be measured as a bit error rate, which is a ratio of error bits to a number of bits transmitted. In the past, the bit error rate has been measured at the receiver end of a communications system.

For example, one known bit error rate estimator system includes programming equipment on the transmitter side of a network and estimating equipment on the receiver side of the network. This system generates a reference pattern of data at the receiver and compares that reference pattern to the actual pattern of data transmitted from the transmitter. The bit errors introduced within the network are accounted for by a counter. At this point, system administrator must manually read and use the comparison data from the bit error rate estimator equipment. In this way, the prior art system has manual error correction.

In addition, the prior art bit error rate estimator system does not use checkpoints within the network, but rather is limited to making error estimations only at the transmitter and receiver ends. Consequently, the system cannot easily be implemented within the transmitter-receiver path, due to cost, power usage, and physical location of the equipment at the transmitter and receiver ends. By way of illustration, programming equipment of the bit error rate estimator may be located in Los Angeles while the estimating equipment may be located in New York City. Accordingly, there would be no bit error rate checkpoints within the path between Los Angeles and New York City. Thus, the prior art system lacks flexible inter-path implementation.

In addition, the N bit counter used in this prior art system and many other systems limits the overall speed by which the system can operate. The number of bits N, and thus the pattern length of $2^N$, is inversely proportional to the speed at which the system may operate. In this way, the speed of the system is limited by the number of bits N, or the pattern length of $2^N$ bits. Furthermore, the known system discussed above is expensive to implement.

Due to the need for efficient high speed communications and in view of the problems associated with the prior art, a need exists for a programmable bit error rate estimator capable of automatic error correction, capable of operating at speeds that are independent of pattern length, and having flexible inter-path and cost-effective implementations.

SUMMARY OF THE INVENTION

In accordance with one embodiment of the invention, a programmable bit error rate estimator having automatic error correction and flexible inter-path implementation is provided. The bit error rate estimator of the present invention uses an initialization configuration for a reference pattern generator of a receiver in such a way as to eliminate the need for an N bit counter. One option allows the system administrator to monitor the errors in the system and take steps as deemed necessary. Another option counts the errors in a specified amount of time and generates a new reference pattern if the number of errors reaches a predetermined maximum amount. Additionally, the bit error rate estimator of the present invention may be implemented at many router points of a network. Thus, the bit error rate estimator of the present invention provides automatic error detection, programmability, and flexible inter-path implementation.

BRIEF DESCRIPTION OF THE DRAWING FIGURES

The subject invention will hereinafter be described in the context of the appended drawing figures, wherein like numerals denote like elements, and:

DETAILED DESCRIPTION

Figure 1:
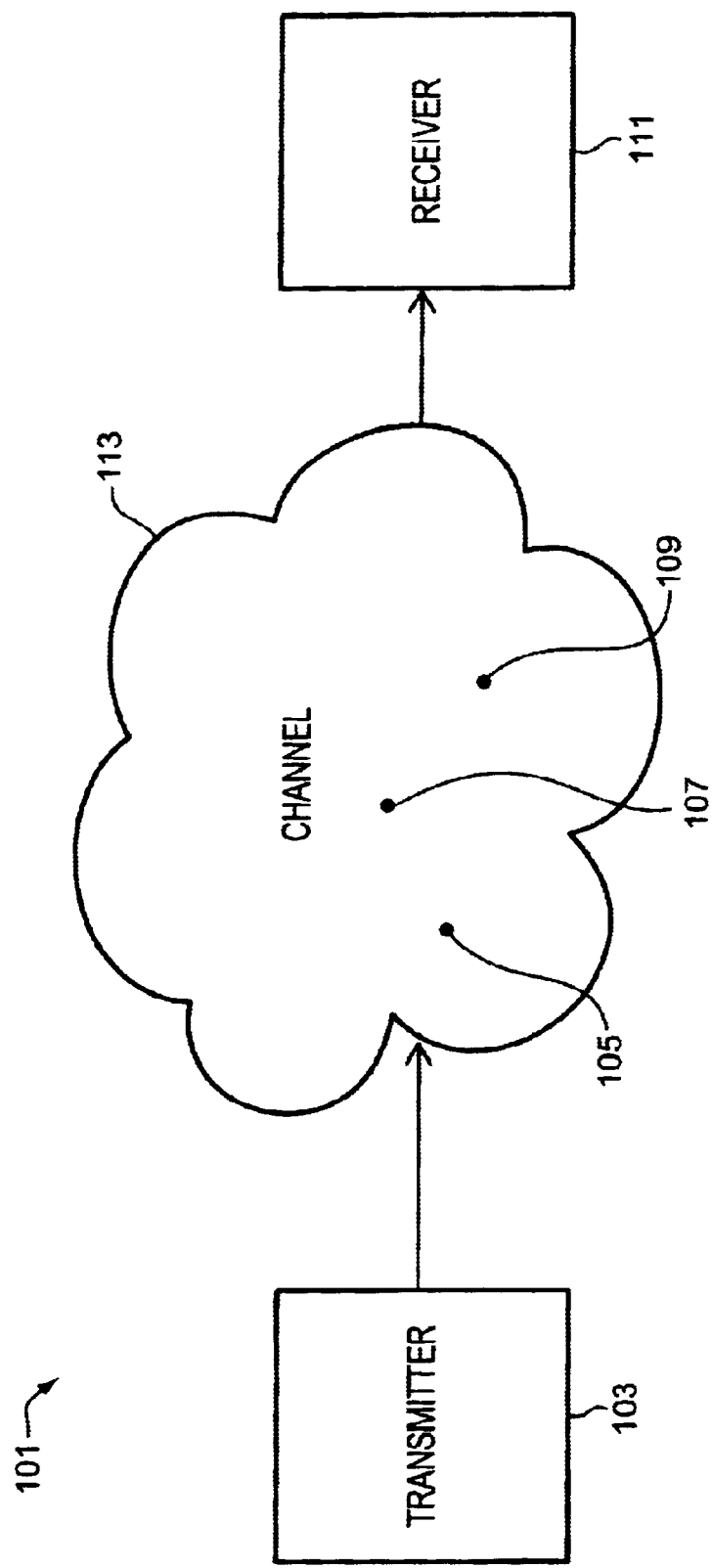
FIG. 1 is a schematic representation of a communications system having a channel.

A communications system is often associated with a channel by which a transmitter and a receiver may communicate. FIG. 1 illustrates a communications system 101 including a transmitter 103, a receiver 111, and a channel 113. For example, channel 113 could be a SONET fiber optic channel, as discussed above, or a channel associated with any other desired application such as ADSL (Asynchronous Digital Subscriber Line), cable modems, other networking applications, or the like. In the context of one practical application, channel 113 has many router points 105, 107, and 109 where digital data is received and re-transmitted until it reaches its destination at receiver 111. Each time the data is received and re-transmitted, digital errors may occur. For this reason, the bit error rate for communication system 101 may be monitored so that the quality of the data transmission can be improved. The bit error rate helps in estimating the quality of channel 113 between transmitter 103 and receiver 111.

Figure 2:
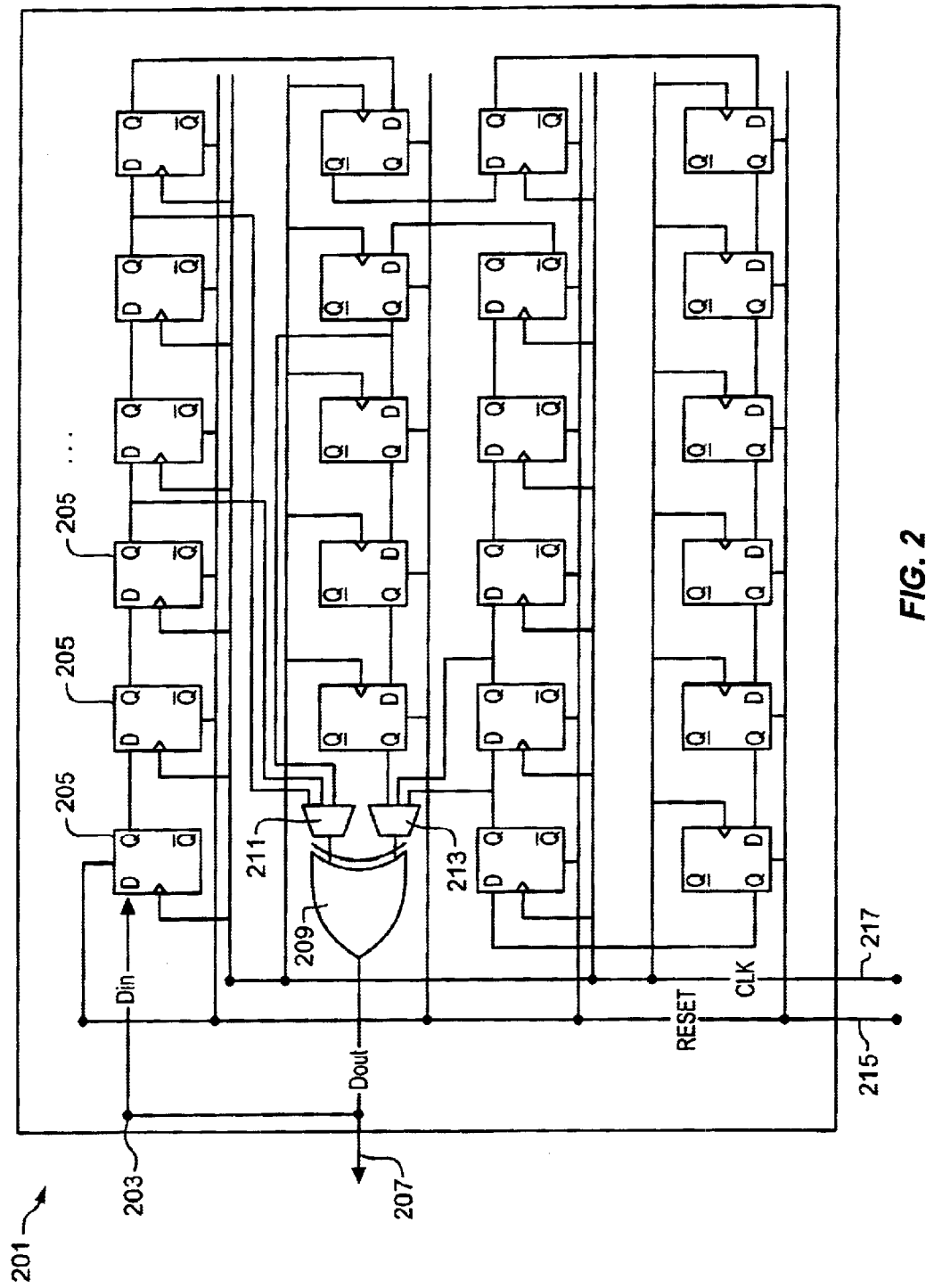
FIG. 2 is a schematic representation of a transmitter of a communications system in accordance with one embodiment of the present invention.

In accordance with one embodiment of the present invention, FIG. 2 illustrates a transmitter 201 configured to transmit data across a channel (not shown). Transmitter 201 includes an input (DIN) 203 which is preferably coupled to a plurality of memory elements 205, and an output (Dout)

207. Transmitter 201 also includes a logic XOR gate 209 having its output coupled to output 207 and its inputs coupled to the outputs of a first and a second multiplexer 211 and 213, respectively. First and second multiplexers 211 and 213 have their various inputs coupled to the various outputs of the plurality of memory elements 205. Transmitter 201 further includes a reset 215 and a clock 217, each of which is coupled to the plurality of memory elements 205.

Input 203 receives data bit by bit into each of the plurality of memory elements 205. For example, the plurality of memory elements 205 may be D flip-flops configured to receive a bit of data and shift the bit into the next D flip-flop. In this way, the plurality of memory elements 205 would behave as one-bit shift registers. In an exemplary embodiment of the present invention, the plurality of memory elements 205 are twenty-three (23) D flip-flops. However, transmitter 201 may be implemented using any number N of memory elements depending on the desired use. In the context of this application, the number of memory elements N corresponds to the number of bits N, where a pattern that transmitter 201 transmits will have a length of $2^N$ bits. A pattern having a length of $2^N$ bits will repeat every $2^N$ clock cycles. In addition, transmitter 201 may transmit any number of various patterns having a length of $2^N$ bits. In one embodiment of the present invention, transmitter 201 is configured for a number of bits N equal to 7, 15, 22, or 23 having pattern lengths of $2^7$, $2^{15}$, $2^{22}$, and $2^{23}$, respectively. For example, if transmitter 201 is configured for N=23 bits, or a pattern length of $2^{23}$, then the smaller lengths of 7, 15, and/or 22 may also be transmitted by transmitter 201 by simply not using all the plurality of memory elements 205 of transmitter 201. However, transmitter 201 may be configured to transmit any number of bits N (including less than N=7 and more than N=23) depending on the desired need.

The bits of data are then inputted into first and second multiplexers 211 and 213 before entering XOR gate 209. XOR gate 209 generates an output which is a function of the contents of the plurality of memory elements 205. Once the data has been formatted in a pattern, the data is transmitted via a channel (not shown) to a receiver (not shown). Transmitter 201 may be any type of transmitter and is discussed here as one embodiment to provide continuity with one embodiment of the receiver of the present invention, as discussed below.

Figure 3:
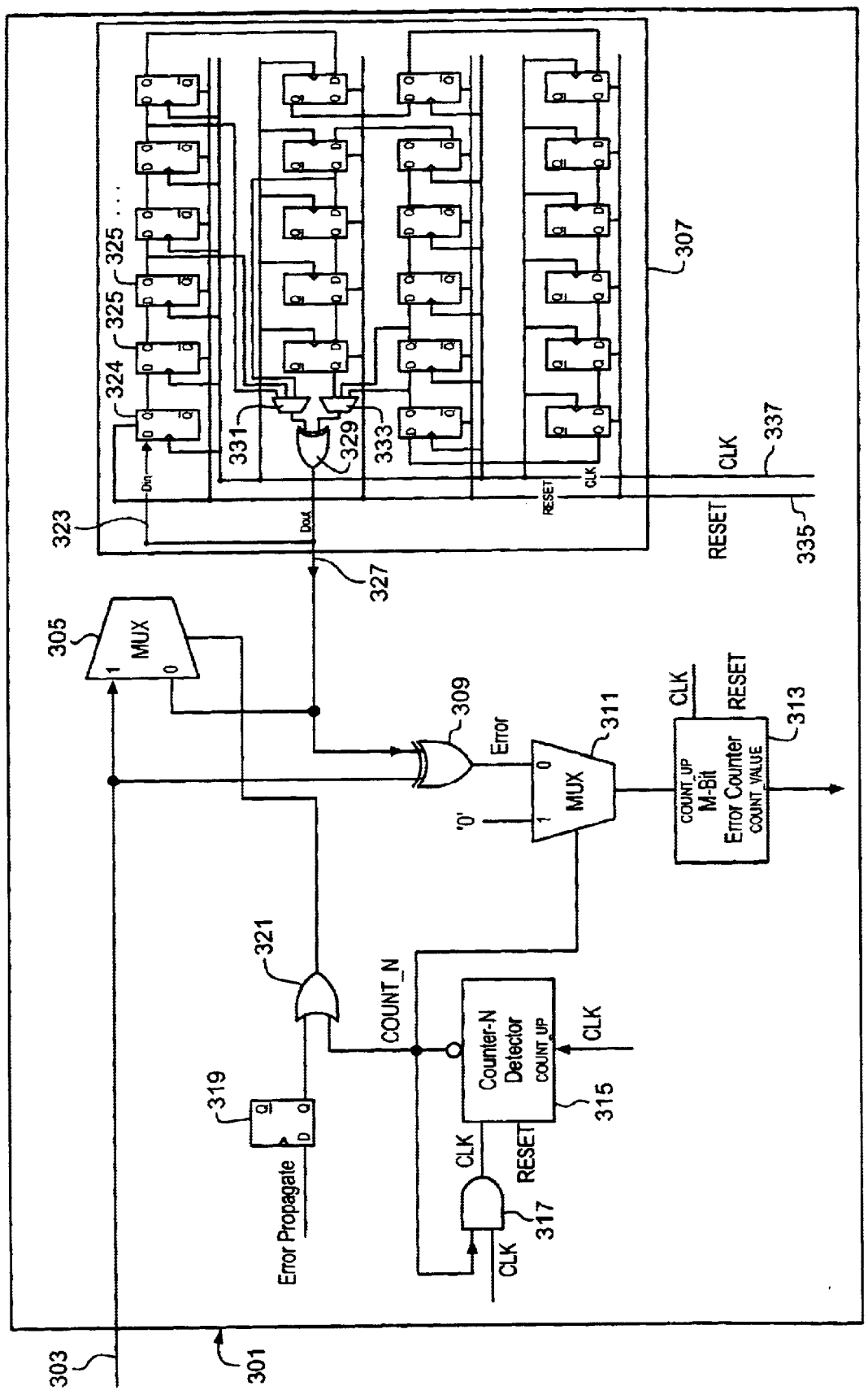
FIG. 3 is a schematic representation of a receiver of a communications system in accordance with one embodiment of the present invention.

In accordance with one embodiment of the present invention, a receiver 301 in FIG. 3 receives data transmitted from transmitter 201 of FIG. 2 and compares the transmitted data with a reference pattern of data generated at receiver 301. By comparing the transmitted data with a reference pattern of data, receiver 301 may estimate the bit error rate associated with the data transmitted from transmitter 201 to receiver 301. By way of illustration, receiver 301 may be a router chip which may be implemented at any number of router points within a communications system, including at transmitter 201, within a channel, or at receiver 301.

FIG. 3 illustrates receiver 301 of the present invention having an input 303, a first multiplexer 305, a reference pattern generator 307, a logic XOR gate 309, a second multiplexer 311, an M-bit error counter 313, a counter-N detector 315, a logic AND gate 317, an error propagate bit 319, and a logic OR gate 321. Reference pattern generator 307 generates bits in such a manner as to model the bits transmitted by a corresponding transmitter, e.g., transmitter 201 of FIG. 2. Reference pattern generator 307 includes an input (DIN) 323 coupled to the input of a first memory element 324 and a plurality of memory elements 325, and an output (Dout) 327. Reference pattern generator 307 aims to locally generate the same pattern actually transmitted by transmitter 201 of FIG. 2. Accordingly, reference pattern generator 307 also includes a logic XOR gate 329 having its output coupled to output 327 and its inputs coupled to the outputs of a first and a second multiplexer 331 and 333, respectively. First and second multiplexers 331 and 333 have their various inputs coupled to the various outputs of first memory element 324 and the plurality of memory elements 325. Reference pattern generator 307 further includes a reset 335 and a clock 337, each of which is coupled to first memory element 324 and the plurality of memory elements 325.

Before transmission begins, receiver 301 is initialized by resetting (e.g., zeroing) M-bit error counter 313 and counter-N detector 315. Initialization also includes selecting the error propagate bit 319 (or allowing it to remain the same as a prior data transmission), zeroing the plurality of memory elements 325, and setting first memory element 324 to a logic one. Alternatively, the plurality of memory elements 325 may be set to a logic one and first memory element 324 may be set to a logic zero. Accordingly, the bit contained in first memory element 324 should be different from each of the bits contained in the plurality of memory elements 325 in order to signal receipt of N bits and further initiate error detection, as discussed below.

Following initialization, data is received at input 303 via a channel (not shown) and inputted into first memory element 324 and the plurality of memory elements 325. Once N bits are received at input 323, the bit contained in first memory element 324 (which would have been shifted by N bits to the $N^{th}$ memory element of the plurality of memory elements 325) will trigger or indicate that the first N bits of the first pattern will be transmitted next. In this way, the configuration of the initialization of first memory element 324 and the plurality of memory elements 325 behaves in such a way as to function as a counter. Consequently, an N bit counter that would normally be used for this function has been eliminated by the configuration and initialization scheme of first memory element 324 and the plurality of memory elements 325. In the past, such an N bit counter was necessary to determine when the Nth bit of a pattern of bits was received at receiver 301. Such N bit counters slowed down the system depending on the number of bits N. Accordingly, by eliminating the N bit counter in the present invention, the speed of communication (i.e., the maximum operating frequency of the system) is independent of the number of bits N. Following that, the speed of communication is independent of the length of the pattern of $2^N$ bits transmitted by a transmitter and/or generated by a receiver.

Figure 4:
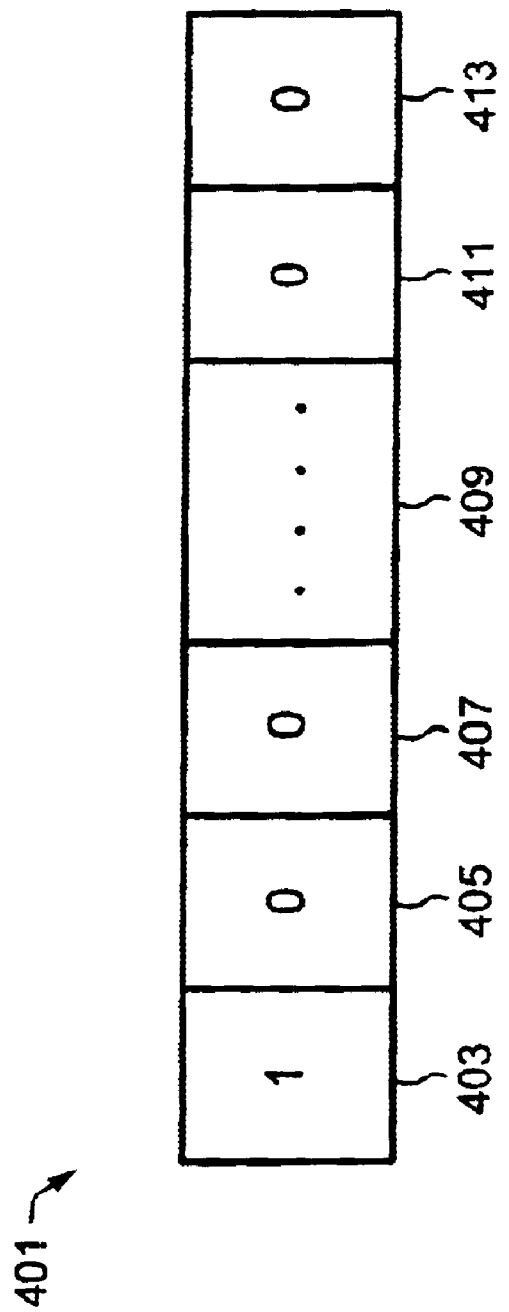
FIG. 4 is a schematic representation of a plurality of memory elements within a reference pattern generator.

In order to more clearly understand the configuration and initialization of first memory element 324 and the plurality of memory elements 325, FIG. 4 illustrates N memory elements 401 initially containing a logic one in a first memory element 403 and logic zero in the remaining N−1 memory elements 405, 407, 409, 411, and 413. As discussed above, alternatively, first memory element 403 may initially contain a logic zero and the remaining N−1 memory elements 405, 407, 409, 411, and 413 may initially contain logic one. Accordingly, first memory element 403 need only be a value different from the remaining N−1 memory elements 405, 407, 409, 411, and 413. As data is shifted to the right bit by bit, output 327 of FIG. 3 outputs the zero bits of the N−1 memory elements 405, 407, 409, 411, and 413. However, when the logic one that was initially in first memory element 403 is shifting from memory element 413 to output 327, reference pattern generator 307 will recognize that the next bit inputted from input 303 into input 323 will be the first bit of a pattern actually transmitted, where the pattern actually transmitted will be compared to a reference pattern of bits, as discussed below. Thus, instead of using an N bit counter to determine when the first bit of the pattern will be received by input 303, reference pattern generator 307 initializes and configures its local memory elements in such a way as to be capable of recognizing when the first bit of the pattern will be received by input 303. Consequently, an N bit counter that would normally be used for this function has been eliminated.

In addition, receiver 301 also provides the flexibility of a programmable counter function. In this respect, reference pattern generator 307 may add a delay in order to dictate which bit is the "last" bit of N bits. By way of illustration, if reference pattern generator 307 has a 23 (twenty-three) bit capacity (i.e., the $23^{rd}$ bit is the "last" bit in a pattern), but the number of bits being transmitted to receiver 301 is only 7 (seven) bits (i.e., the $7^{th}$ bit is the "last" bit in a pattern), then reference pattern generator 307 must be able to recognize such a shorter pattern length. Reference pattern generator 307 recognizes the shorter pattern length of 7 bits in this example because XOR gate 329 closes the loop from the $7^{th}$ memory element forward. Accordingly, reference pattern generator 307 may add a delay in order to account for such a short pattern length by closing the feedback loop to reference generator 307. Thus, XOR gate 329 closes the feedback loop to reference generator 307 depending on the number of bits N. In this respect, counters, XOR gates, or other elements within receiver 301 may be re-used for a number of different pattern lengths, which reduces the area and power consumption of the integrated circuit.

At this point, N bits of the first pattern transmitted will be inputted from input 303 into first memory element 403 and the remaining N−1 memory elements 405, 407, 409, 411, and 413 bit by bit. Once the first N bits of the first pattern are inputted into reference pattern generator 307, reference pattern generator 307 will generate a reference pattern of bits having a pattern length of $2^N$ bits that repeats every $2^N$ clock cycles. As the N bits (following the first N bits) of a pattern are received by receiver 301, each bit actually received is compared to each bit generated by reference pattern generator 307. Accordingly, reference pattern generator 307 must be synchronized with the pattern being transmitted by the transmitter. Synchronization may require a timing alignment between the reference pattern of bits and the pattern of bits transmitted by the transmitter. Synchronization is signaled by the Nth bit, indicating that a pattern has been loaded in reference pattern generator 307. In this way, if each bit of the reference pattern does not match each corresponding bit actually transmitted to receiver 301, then an error may result.

If an error is detected by XOR gate 309, receiver 301 has two operating options. Either of the two operating options may be selected by setting error propagate bit 319. Receiver 301 may be programmed to define which operating option corresponds to which setting of error propagate bit 319. For example, error propagate bit 319 may be programmed to be a logic zero corresponding to a first operating option and a logic one corresponding to a second operating option. Thus, the system administrator may define and program error propagate bit 319 as desired.

By way of illustration, one option may account for an error by incrementing M-bit error counter 313 and using the originally generated reference pattern of reference pattern generator 307 as the reference pattern to continue comparing each actually transmitted bit with each generated reference bit. Such an option allows the system administrator to interpret the error and take any necessary steps accordingly. A second option may operate such that the bit causing the error may be used to generate the next reference bit by reference pattern generator 307 whereby receiver 301 checks to determine whether the transmitted pattern has changed to a new pattern. Such a second option is achieved by "saturating" counter-N detector 315 such that the error propagate bit 319 will be changed to indicate to first multiplexer 305 to generate a new reference pattern based on the bit causing the error. The error propagate bit 319 will change if counter-N detector 315 counts up to its maximum predetermined value. At that point, counter-N detector 315 "saturates" (i.e., counts up to its maximum allowed value) and indicates to error propagate bit 319 to change its value. Consequently, the output of OR gate 321 will direct first multiplexer 305 to use the bit causing the error to generate a new pattern by reference pattern generator 307. However, in this second option, if counter-N detector 315 does not saturate, then error propagate bit 319 will not change and will not indicate to first multiplexer 305 to change its pattern. Rather, the originally generated reference pattern by reference pattern generator 307 will continue generating as usual. Thus, the system administrator may pre-set receiver 301 to use only one of these two options. Therefore, in addition to programmability of pattern lengths (discussed above), receiver 301 offers programmability of choosing from two error detection and correction options.

Figure 5:
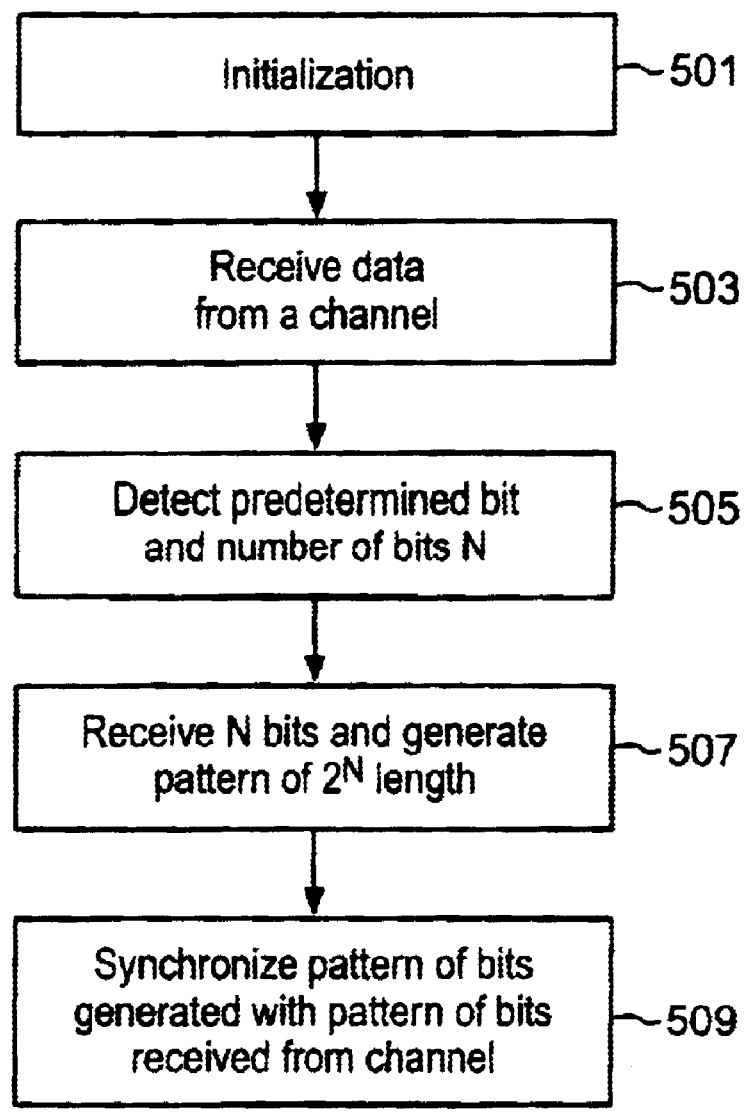
FIG. 5 is a flowchart relating to a bit error rate estimation method of the present invention.

In order to better understand the error correction of the present invention, FIG. 5 illustrates a method of bit error rate estimation of the present invention. In step 501, the bit error rate estimator of the present invention is initialized. Initialization may include zeroing counters, memory elements, and the like. In accordance with an exemplary embodiment of the present invention, initialization includes zeroing a plurality of memory elements of a reference pattern generator of the bit error rate estimator, except the first memory element. In this exemplary embodiment of the present invention, the first memory element is initialized to a logic one, in order to differentiate it from the rest of the memory elements. In addition, initialization may include selecting an error propagate bit, or alternatively, allowing the error propagate bit to retain its present value.

In step 503, the bit error rate estimator receives digital data from a channel. After receiving data from the channel, the bit error rate estimator may recognize a predetermined bit and determine the number of bits N in step 505. In step 507, the bit error rate estimator receives the N bits and generates a pattern having a length of $2^N$ bits. Once the pattern of bits having a length of $2^N$ bits is generated, the bit error rate estimator synchronizes the generated bits with the pattern of bits actually received from the channel in step 509. Synchronization includes both timing alignment between the reference pattern of bits and the transmitted pattern of bits, and detection and/or correction of errors.

Figure 6:
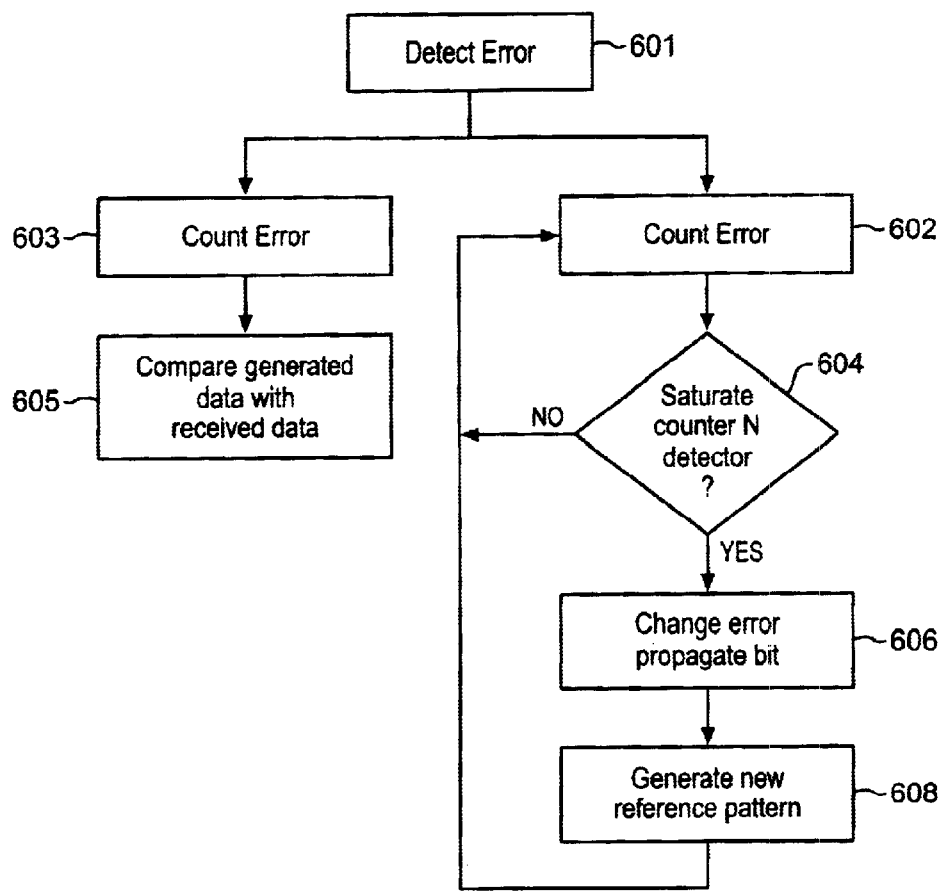
FIG. 6 is a flowchart relating to a synchronization method of the present invention.

In accordance with one embodiment of the present invention, error correction through synchronization of the generated bits of a bit error rate estimator and the bits actually received from the channel is illustrated in FIG. 6. In this way, the bit error estimator behaves as a controller for synchronizing the pattern of bits received from the transmitter with the pattern of bits generated at the receiver. For example, the bit error rate estimator may generate a new reference pattern based on an error bit, or detect and count an error bit. In either situation, the bit error rate estimator may be programmed to choose from a plurality of options. Thus, the flowchart of FIG. 6 illustrates two error correction options.

In step 601, an error is detected by the bit error rate estimator. As discussed above, the bit error rate estimator of the present invention may have a plurality of options in addressing the detected error. By way of illustration, in a first option in step 603, the bit error rate estimator may count the error detected. In step 605 of the first option, the bit error rate estimator may continue comparing generated data with received data. In step 605, the bit error rate is evaluated by a system administrator and steps may be taken as deemed necessary to correct or account for the error(s). The process involved in this first option repeats by continuing to count errors such that the system administrator may continue taking steps as necessary.

Alternatively, in a second option in step 602, the bit error rate estimator may count the error detected. In step 604 of the second option, the bit error rate estimator may check to determine whether a counter-N detector has saturated (i.e., reached a maximum pre-selected value). If the counter-N detector has not saturated, then another error will be counted in step 602 and another iteration of step 604 occurs until the iterations of steps 602 and 604 saturate counter-N detector. Consequently, if the counter-N detector saturates, then an error propagate bit changes in step 606 to indicate that a new reference pattern must be generated. In step 608, a new reference pattern is generated and another iteration of step 602 occurs. Thus, the two synchronization options in the flowchart of FIG. 6 provide programmability of the bit error rate estimator of the present invention.

Overall, the bit error rate estimator of the present invention provides programmability, automatic error detection, and flexible inter-path implementation. The bit error rate estimator of the present invention allows for the option of programming various error correction schemes. In one of the options, for example, automatic error correction is provided. In addition, the elimination of an N bit counter allows for flexible inter-path implementation of the bit error rate estimator of the present invention. Furthermore, the bit error rate estimator of the present invention may be implemented in conjunction with the prior art methods of bit error rate estimation, such that it provides further flexibility of use.

Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims.

What is claimed is:

1. A method for estimating a bit error rate of a communications system, comprising the steps of:
    initializing a plurality of memory elements at a receiver to have a predetermined bit in a first memory element and bits different from the predetermined bit in the remaining memory elements;
    detecting the predetermined bit to trigger receipt of N bits of data at the receiver;
    determining the number of bits N for a pattern having a length of $2^N$;
    generating a reference pattern of $2^N$ bits at the receiver;
    synchronizing the bits received with the bits of the reference pattern generated; and
    comparing the bits received with the bits of the reference pattern to estimate the bit error rate.

2. The method of claim 1, further comprising the steps of:
    synchronizing the bits received with the bits of the reference pattern generated for detecting an error bit;
    saturating a counter-N detector which is configured to count the number of error bits detected; and
    generating a new reference pattern based on the error bit.

3. The method of claim 1, further comprising the step of synchronizing the bits received with the bits of the reference pattern generated for counting the number of errors in the communications system.

4. The method of claim 1, further comprising the step of configuring the plurality of memory elements as shift registers.

5. A system for estimating a bit error rate of a communications system, comprising:
    a transmitter for transmitting a pattern of bits; and
    a receiver for receiving the transmitted pattern of bits, comprising:
        a reference pattern generator for generating a reference pattern of bits, wherein the reference pattern generator comprises a plurality of memory elements that are initialized such that the memory elements behave as a counter; and
        circuitry for synchronizing the pattern of bits received from the transmitter with the reference pattern of bits, and comparing the pattern of bits received with the bits of the reference pattern to estimate the bit error rate.

6. The system of claim 5, wherein:
    the circuitry includes a counter-N detector for detecting and counting at least one error bit, such that the counter-N detector saturates upon counting a maximum number of error bits; and
    the reference pattern generator generates a new reference pattern of bits based on an error bit when the counter-N detector saturates.

7. The system of claim 5, wherein:
    the reference pattern generator is configured to count the number of bits N for a pattern of bits having a length of $2^N$; and
    the reference pattern generator generates a reference pattern of bits having a length of $2^N$ bits upon counting N number of bits.

8. A system for estimating a bit error rate of a communications system, comprising:
    a reference pattern generator configured to receive at least N bits of a pattern and generate a reference pattern based on the N bits received, wherein the reference pattern generator comprises a plurality of memory elements that are initialized such that the memory elements count the first N bits received; and
    circuitry configured to direct the reference pattern generator to generate a reference pattern of bits and to count errors.

9. The system of claim 8, wherein:
    the initialization of the reference pattern generator comprises setting a first memory element to a logic one and setting remaining memory elements to logic zero;
    the reference pattern generator receives N bits of the pattern and generates a reference pattern having a length of $2^N$ bits; and
    the reference pattern generator further includes an input and an output, wherein when the reference pattern generator outputs the logic one initially stored in the first memory element, the reference pattern generator recognizes that the next bit inputted into the input is the first bit of the pattern transmitted to the system that will be compared to the reference pattern generated.

10. The system of claim 8, wherein:

the initialization of the reference pattern generator comprises setting a first memory element to a logic zero and setting remaining memory elements to logic one;

the reference pattern generator receives N bits of the first pattern and generates a reference pattern having a length of $2^N$ bits; and the reference pattern generator further includes an input and an output, wherein when the reference pattern generator outputs the logic zero initially stored in the first memory element, the reference pattern generator recognizes that the next bit inputted into the input is the first bit of the pattern transmitted to the system that will be compared to the reference pattern generated.

11. The system of claim 8, wherein the circuitry is programmed to direct the reference pattern generator to generate a new reference pattern when the number of errors reaches a maximum number.

12. The system of claim 8, wherein the circuitry uses an error propagate bit to program the system to direct the reference pattern generator to count errors and to generate a new reference pattern when a maximum number of errors is reached.

13. The system of claim 8, wherein the reference pattern has a pattern length of $2^N$ bits and repeats every $2^N$ clock cycles.

14. The system of claim 8, wherein:

the bits received and the bits of the reference pattern generated are synchronized for detecting an error bit;

a counter-N detector, which is configured to count the number of error bits detected, is saturated; and a new reference pattern is generated based on the error bit.

15. The system of claim 8, wherein the bits received and the bits of the reference pattern generated are synchronized for counting the number of errors.

16. The system of claim 8, wherein:

the initialization of the reference pattern generator comprises setting a first memory element to a logic one and setting remaining memory elements to logic zero;

the reference pattern generator receives N bits of the first pattern and generates a reference pattern having a length of $2^N$ bits;

the reference pattern generator further includes an input and an output, wherein when the reference pattern generator outputs the logic one initially stored in the first memory element, the reference pattern generator recognizes that the next bit inputted into the input is the first bit of the pattern transmitted to the system that will be compared to the reference pattern generated;

the bits received and the bits of the reference pattern generated are synchronized for detecting an error bit;

a counter-N detector, which is configured to count the number of error bits detected, is saturated; and a new reference pattern is generated based on the error bit.

17. A high speed data communication system, comprising:

a channel;

a transmitter configured to transmit a pattern of data over the channel to a receiver; and a router chip between the transmitter and the receiver, comprising:

a plurality of memory elements initialized to have a predetermined bit in a first memory element and bits different from the bit in the first memory element in remaining memory elements and configured to receive the pattern of data from the transmitter; and circuitry for determining the number of bits N in the pattern, directing a reference pattern generator to generate a reference pattern of $2^N$ bits after detecting the predetermined bit, and synchronizing the pattern of bits transmitted from the transmitter with the pattern of bits generated by the reference pattern generator.

18. The system of claim 17, including a plurality of router chips.

* * * * *